(No Model.)

G. W. McCLURE.
WAGON RUNNING GEAR.

No. 550,455. Patented Nov. 26, 1895.

Witnesses
L. M. Spong
A. P. Sangster

George W. McClure Inventor.
By James Sangster
Attorney.

UNITED STATES PATENT OFFICE.

GEORGE W. McCLURE, OF SPRINGVILLE, NEW YORK.

WAGON RUNNING-GEAR.

SPECIFICATION forming part of Letters Patent No. 550,455, dated November 26, 1895.

Application filed May 11, 1895. Serial No. 548,945. (No model.)

*To all whom it may concern:*

Be it known that I, GEORGE W. McCLURE, a citizen of the United States, residing at Springville, in the county of Erie and State of New York, have invented certain new and useful Improvements in Wagons, of which the following is a specification.

My invention relates to certain improvements in the running-gear for wheeled vehicles, and will be fully and clearly hereinafter described and claimed, reference being had to the accompanying drawings, in which—

Figure 1:
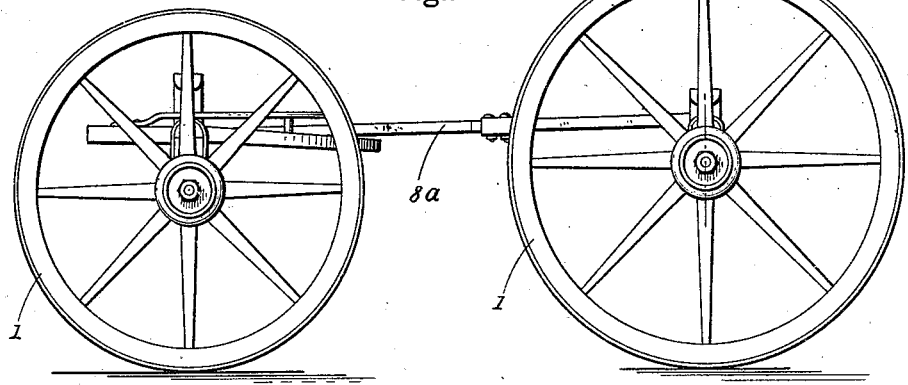
Figure 2:
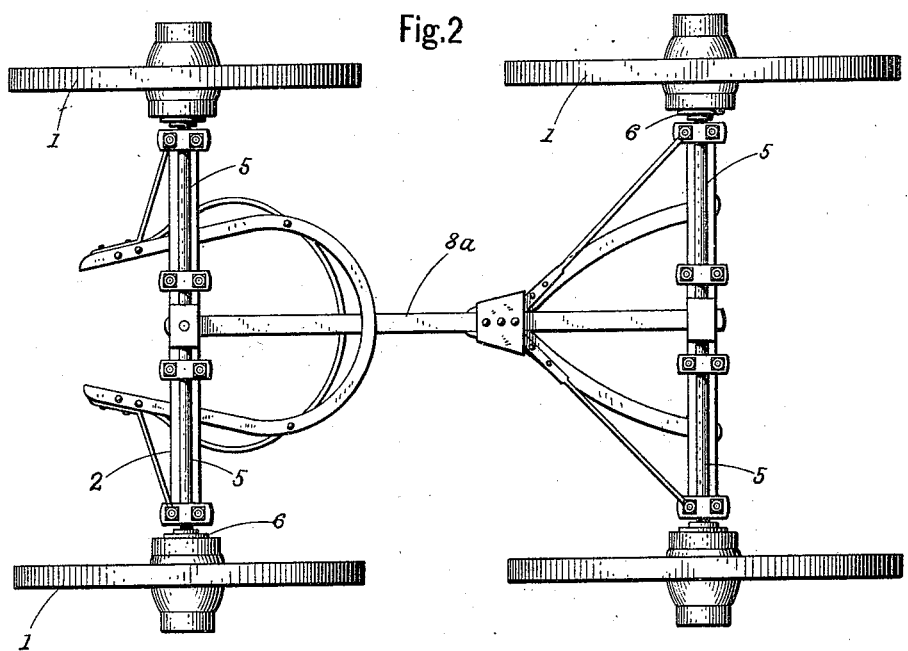
Figure 5:
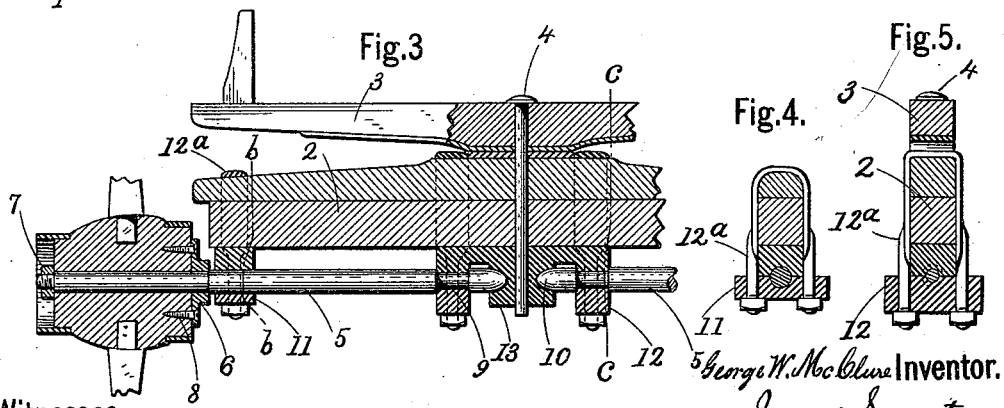
Figures 3, 4:
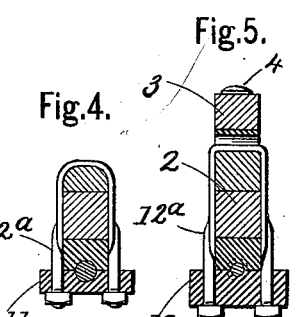

Figure 1 represents a side elevation of a wagon. Fig. 2 is an inverted plan view of a wagon, showing a similar view of my improved device connected therewith. Fig. 3 is a fragmentary sectional elevation cutting centrally through one of the front hubs, a part of the transverse bed-piece, and bolster. Fig. 4 represents a vertical section on or about line $b\ b$, Fig. 3. Fig. 5 represents a vertical section on or about line $c\ c$, Fig. 3.

Referring to the drawings in detail, 1 represents the wheels of the wagon. 2 is the transverse bed-rest on which the bolster 3 is supported and secured by a king-bolt 4. The wheels are each provided with a shaft 5, having a flanged collar 6 and a nut 7 by which it is rigidly secured to the wheel-hub, (see Fig. 3,) the flanged collar being secured to the inner end of the hub by screws 8. $8^a$ represents the usual reach connecting the front and rear bed-rests.

The shafts 5 are all provided with a reduced journal-box portion 9 near the end and an oval pointed end 10. The shafts near the wheel-hubs are mounted in boxes 11, and near their ends their reduced portions 9 are mounted in boxes 12. These boxes 11 and 12 are rigidly secured by clips $12^a$ to the under side of the bed-rest 2. Between the boxes 12 is a central portion 13, provided with oval depressions on each opposite side, in which the corresponding oval ends 10 of the shafts 5 are fitted.

It will be noticed by reference to Fig. 3 that the central supporting portion having the upper portions of the two boxes 12 and the central double-socketed portion 13 are all formed in one integral piece. This construction provides not only a simple and cheap device for the purpose, but a true end bearing for both shafts not liable to be moved or one box get out of alignment with the other. It is therefore a strong and durable device for the purpose for which it is adapted.

The object of this invention is to lighten the draft and increase the strength and durability of the vehicle.

The journals being easy and convenient to get at, they can be readily lubricated at any time without the necessity of removing the wheels.

I claim as my invention—

In a wagon, a pair of vehicle wheels each having a journal shaft rigidly secured to each hub, in combination with a bed rest provided with side boxes rigidly secured to it by clips, in which the shafts are supported near the wheel hubs, and with a central double box, having box portions in which is mounted the reduced portions of the two shafts, and a central portion having recesses adapted to receive the pointed ends of the shafts, the whole formed in one integral piece, and means for securing it to the bed rest, as and for the purposes described.

GEORGE W. McCLURE.

Witnesses:
JAMES SANGSTER,
A. J. SANGSTER.